(12) United States Patent
Ghannam et al.

(10) Patent No.: US 11,044,580 B2
(45) Date of Patent: Jun. 22, 2021

(54) SYSTEMS AND METHOD FOR POTENTIALLY ENHANCED VEHICLE SAFETY FOR PASSENGERS USING BLOCKCHAIN

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/436,853

(22) Filed: Jun. 10, 2019

(65) Prior Publication Data
US 2020/0389760 A1    Dec. 10, 2020

(51) Int. Cl.
| H04W 4/029 | (2018.01) |
| G07C 5/08 | (2006.01) |
| H04W 4/44 | (2018.01) |
| H04L 9/06 | (2006.01) |

(52) U.S. Cl.
CPC .......... *H04W 4/029* (2018.02); *G07C 5/0841* (2013.01); *H04L 9/0637* (2013.01); *H04W 4/44* (2018.02)

(58) Field of Classification Search
CPC ...... H04W 4/029; H04W 4/44; G07C 5/0841; H04L 9/0637; B60N 2/002; B60N 2/26; G08B 21/0202; B60R 2300/8013
See application file for complete search history.

(56) References Cited

U.S. PATENT DOCUMENTS

| 2015/0242820 A1* | 8/2015 | Oz | ................. G06F 16/951 |
| | | | 705/7.21 |
| 2018/0108089 A1 | 4/2018 | Jayachandran | |
| 2018/0126950 A1* | 5/2018 | Aiderman | ............... B60R 25/31 |
| 2018/0299895 A1* | 10/2018 | Knotts | ............... G06K 7/10297 |
| 2018/0338241 A1* | 11/2018 | Li | ................. H04L 67/1097 |

(Continued)

FOREIGN PATENT DOCUMENTS

| CN | 108596345 A | 9/2018 |
| CN | 109344290 A | 2/2019 |

OTHER PUBLICATIONS

Messer, S. (Jun. 14, 2017). How 4 technologies designed to prevent hot car deaths work (11 pages). Retrieved from https://abcnews.go.com/US/technologies-designed-prevent-hot-car-deaths-work/story?id=47991074.

*Primary Examiner* — Barry W Taylor
(74) *Attorney, Agent, or Firm* — Brandon Hicks; Eversheds Sutherland (US) LLP

(57) ABSTRACT

Systems, methods, and computer-readable media are disclosed describing potentially enhanced vehicle safety for passengers using blockchain. Example methods may include tracking a location of a first user using at least one device; determining a first state comprising the first user entering a vehicle with a second user; receiving a first confirmation of the first state from the device; adding a first transaction to a blockchain, the first transaction comprising a description of the first state and the first confirmation; determining a second state comprising the second user exiting the vehicle while the first user remains in the vehicle; and adding a second transaction to the blockchain, the second transaction comprising a description of the second state.

18 Claims, 10 Drawing Sheets

300

| Ledger 302 | | | |
|---|---|---|---|
| Nodes 304 | Sensors and Computer 306 | | Note 308 |
| House | With Internal and External Cameras and Computer | | Child Image or Wearable Devices are Known |
| Car/s | With Interior and Exterior Cameras and Sensors and Computer | | Child Image or Wearable Devices are Known |
| Mother | With Smart Device | | Child Image or Wearable Devices are Known |
| Father | With Smart Device | | Child Image or Wearable Devices are Known |
| Daycare | With Cameras and Computer or Teacher Device | | Child Image or Wearable Devices are Known |
| Others | With Smart Devices and Sensors... | | |

(56) References Cited

U.S. PATENT DOCUMENTS

| | | | |
|---|---|---|---|
| 2018/0374283 A1* | 12/2018 | Pickover | G07C 5/085 |
| 2019/0012249 A1 | 1/2019 | Mercuri et al. | |
| 2019/0098262 A1* | 3/2019 | Veneziano | H04N 7/183 |
| 2019/0166101 A1* | 5/2019 | Ramos | G06F 21/6245 |
| 2019/0385269 A1* | 12/2019 | Zachary | G07C 5/008 |

* cited by examiner

SYSTEMS AND METHOD FOR POTENTIALLY ENHANCED VEHICLE SAFETY FOR PASSENGERS USING BLOCKCHAIN

TECHNICAL FIELD

The present disclosure relates to systems, methods, and computer-readable media for providing potentially enhanced vehicle safety for passengers using blockchain.

BACKGROUND

Children or pets may occasionally be injured or be injured or die after accidentally being left in a vehicle. A system is needed that may help drivers remember not to leave children or pets unattended in the vehicle.

DETAILED DESCRIPTION

Overview

Figure 1:
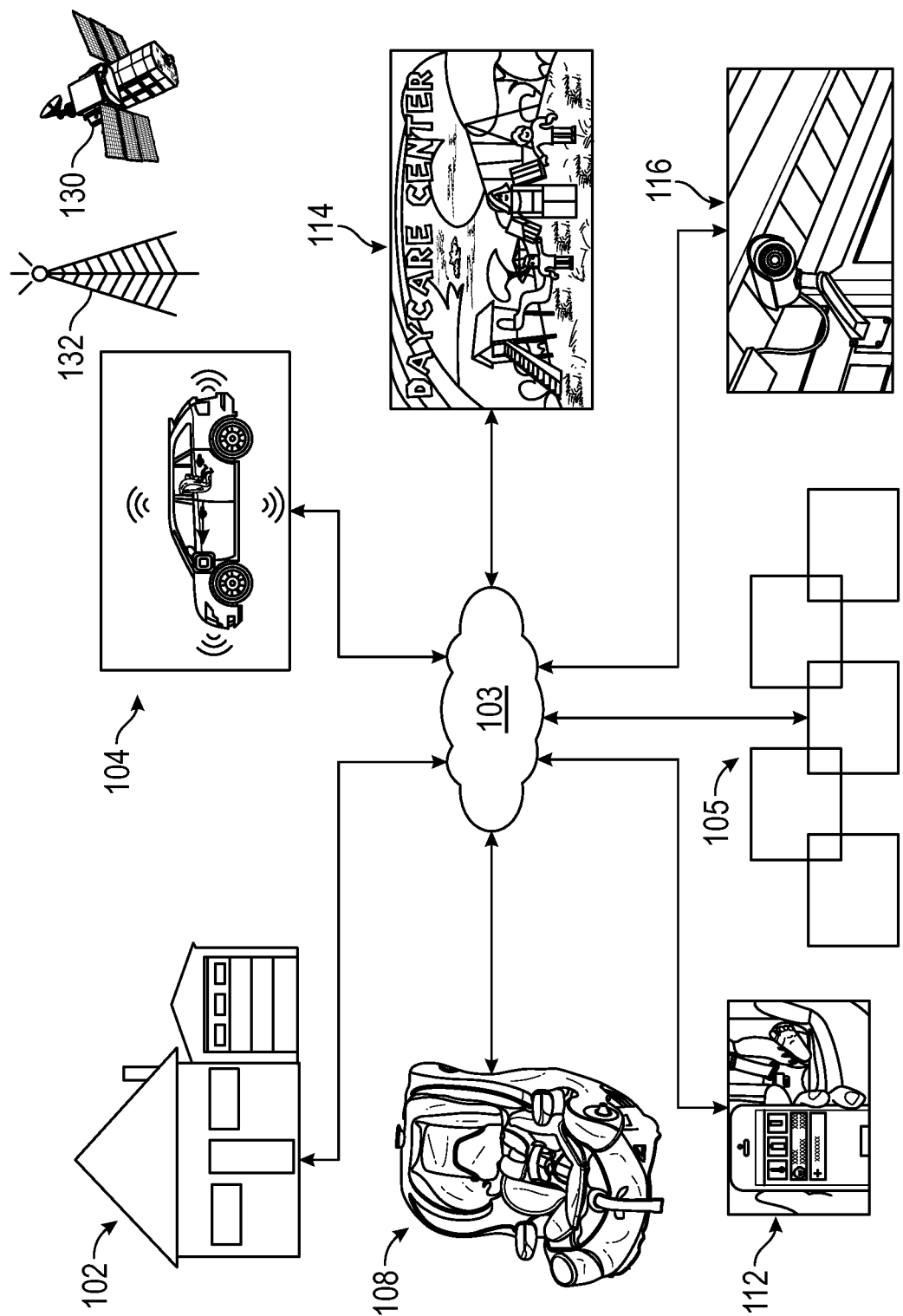
FIG. 1 shows an example usage scenario for potentially increasing vehicle safety for passengers using blockchain, in accordance with example embodiments of the disclosure.

Artificial intelligence (AI) can include computer-implemented techniques and systems that seek to mimic human decision-making using data. Blockchain can represent a technology that can decentralize data control between nodes on a network, generate and examine immutable records on a public ledger, and exchange assets between the nodes. Blockchain can refer to a growing list of records, called blocks, that are linked to one another using cryptographic techniques. AI and blockchain can be used together to perform collaborative learning without using a centralized data store, to detect security concerns on the network of nodes, to improve hash-function privacy, and to predict a likelihood of a node fulfilling certain tasks. As detailed below, systems and methods are described whereby AI and blockchain are used to potentially prevent children from being accidentally left in vehicles.

Conventional systems for preventing children and animals from being left unattended in vehicles may include hardware sensing systems that can be mounted in a vehicle and/or a child seat. The hardware sensing systems may include a corresponding module that can detect the presence of the child and can alert the driver about the presence of the child when the driver leaves. In some example, system performance can depend on the sensing system's sensing reliability. Further, such systems implicitly trust that the driver will not ignore alerts indicative of the presence of the child.

Other systems may include software such as a traffic application that reminds drivers to check the back seat, for example, when their vehicle reaches a given destination and/or when the driver's position changes and moves out of the vehicle's vicinity. This software may have a method of use that may require users to download a corresponding application onto their devices. In general, the application can include a predication-based model and may implicitly assume that the user does not ignore the software-generated alerts and reminders to not leave the child in the vehicle.

In many cases, it may be difficult to deploy such hardware or software systems uniformly throughout a user base. For example, it may be difficult to integrate sensors in every vehicle seat and/or to or trust that every user is capable of connecting such sensors properly. In another example, it may be difficult to enforce users to download and use the correct application and devices to perform the necessary operations for ensuring child and animal safety.

Thus, there is a need for secure, user-friendly, and reliable systems to prevent children and animals from being left in vehicles. In particular, blockchain-based systems and methods may be used to ensure that child presence detection and monitoring systems are in use and that drivers are responsive to alerts generated by such systems.

In various embodiments, the disclosure is directed to a network of nodes using a blockchain for child and animal presence detection and monitoring in vehicles. In some examples, such blockchains may be permissioned. That is, the blockchains can be built that require permission to read the information on the blockchain, and that limit the parties who can transact on the blockchain and that set who can serve the network by writing new blocks into the chain.

Accordingly, embodiments of the disclosure may serve to safeguard children and pets. In some aspects, the permissioned blockchain can include users that can serve as nodes that represent known entities. Additional nodes can include a house, a vehicle, guardians (parents), drivers, a daycare, and the like. In some examples, the nodes can serve to control consensus and validating processes using predefined rules that can be referred to as smart contracts. The consensus and validating processes can refer to a fault-tolerant mechanism that is used in blockchain systems to achieve the necessary agreement on a data value or a state of the network among the nodes.

Moreover, a blockchain-based confirmation mechanism can be incorporated into various nodes such as a vehicle, a smart home, and/or other surveillance systems. The disclosed systems can use various confirmation methods and recording techniques to improve interactions between devices associated with a vehicle, a child or pet, guardians (for example, driver, parents, siblings, etc.), and places (house, daycare, and the like).

In some examples, the disclosed systems can include a blockchain with a ledger that has blocks representing transactions that describe and verify the state of passengers in a vehicle. In other examples, the disclosed systems can provide alerts regarding the passenger state to multiple parties at different nodes, which can reduce the likelihood of a child being left in vehicle. In some examples, the nodes may have various technologies to monitor the presence and/or movement of individuals (e.g., children and guardians) and/or animals (e.g., pets) in the vehicle and to and from locations associated with the vehicle. Examples of these technologies include, but not be limited to, wireless connected cameras, vehicle monitoring systems, 360-degree panoramic-view cameras, vehicle-interior cameras, facial recognition systems, occupant sensing systems, thermal imaging systems, and voice-recognition systems.

Illustrative Embodiments

As noted, in some weather conditions, the temperature inside a vehicle may reach up to 120 degrees Fahrenheit and can cause health problems for stranded passengers (e.g., children and animals) after a relatively short time. Conventional passenger monitoring systems may be based on the use of centralized data and may have limited passenger detection and alarm response capabilities. Further, there may be a limited communication zone between smart vehicle systems and users. Further, there may be other limited approaches that typically only monitor the driver rather than passengers. Moreover, such systems may have inherent limitations related to the implicit trust that the systems place in individuals' responses to alerts and instructions from the systems.

In some aspects, the disclosed systems can include a peer-to-peer network of nodes that can perform passenger monitoring in a vehicle. Further, the disclosed systems can include a blockchain method to enhance vehicle safety by preventing passengers from being left in vehicle. The disclosed introduces effective levels of monitoring passengers in vehicles. In some cases, the system can include a network of devices distributed throughout network nodes. The devices can include baby monitoring systems (for example, baby vehicle seats, attached sensors, and the like), house sensor systems (internal and external camera systems, internal and external sound systems, and the like), devices (for example, mobile phones, laptops, tablets, and the like) associated with users such as guardians (for example, a father, a mother, driver, and the like), surveillance sensing systems (cameras of parking lot, street, store, and the like), devices (for example, cameras and sound systems) associated with user frequently-visited places (for example, a daycare, a store, and the like), devices associated with vehicle systems (for example, wirelessly-connected cameras, vehicle-monitoring systems, 360-degree panoramic-view camera systems, interior camera systems, facial recognition systems, occupant sensing systems, thermal imaging systems, and voice recognition sensing systems, and the like). In some examples, the nodes can abide by defined rules presented as smart contracts, and each node can hold a copy of the full blockchain which can act as a ledger.

In some examples, the disclosed systems can track a passenger's (e.g., a child's or animal's) position and can share changes of the passenger's position and/or status over time. For example, the disclosed systems can track the child's status as the child leaves home, enters the vehicle, exits the vehicle with a guardian, or is left in the vehicle without a guardian. Further, the disclosed systems can detect and authenticate the passenger's status by the different nodes store corresponding status information in blocks on the ledger. When the passenger's state is determined as being alone in the vehicle, the nodes may be alerted and alternative actions (e.g., window lowering, alarm activation, call to a driver's device, etc.) can be performed.

In some aspects, the disclosed systems can apply AI-based logic to read and analyze the privacy policies, contract terms, and/or conditions associated with the subscribed nodes: for example, the home, the vehicle, the daycare, and the like. The disclosed systems can allow the network to add or remove nodes and/or associated certifications and registrations for terms, devices, vehicles, and/or places (stores, schools, police or security offices). The disclosed systems can use a blockchain authentication system that when incorporated into vehicle-home smart systems, can prevent children and animals from being left alone in vehicles. The disclosed systems can track the status of an individual (e.g., a child) or a pet with respect to residence. For example, the disclosed systems can determine whether the individual or pet is in the house, leaving the house, or out of the house. The disclosed systems can detect the proximity and relationship between the individual and/or pet with a guardian when the individual and/or pet is out of a house. For example, the disclosed systems can determine whether the individual and/or pet is in the vehicle together with the guardian, whether the individual and/or pet and the guardian are leaving the vehicle together, or whether the individual and/or pet is in-vehicle alone. The disclosed systems can determine the proximity and relationship between the individual and/or pet with a place (for example, a daycare). For instance, the disclosed systems can determine whether the individual and/or pet is in or out of the place.

In some examples, when the guardian leaves house with the individual and/or pet, the disclosed system nodes within the network may be informed via a published transaction on the blockchain, which can require verification and confirmation among the network nodes. In other examples, if the disclosed systems determine that the individual and/or pet is left alone in the vehicle, then the vehicle can send information in the form of a transaction (e.g., a message that indicates that child is alone in vehicle) to other node(s) on the network on the blockchain. At least one other node(s) may need to confirm the transaction on the blockchain with a response transaction; otherwise, the transaction may be flagged for the other nodes and an alarm or appropriate response may be triggered. The transaction can be confirmed, for example, by a message from a node that indicates that the driver is with the child.

In some aspects, the disclosed systems may serve to improve passenger safety by preventing a passenger being left alone in a vehicle. The disclosed systems can create a peer-to-peer network of devices associated with guardians and locations (e.g., vehicle, house, daycare) to monitor children and pets. The disclosed systems can generate parameters that can be used to authenticate child and pet safety. For example, the parameters can include a passenger's entry or departure time, a guardian's location and proximity to the passenger, vehicle information, a time of a vehicle's arrival at a location such as a daycare, a store, or a place. The disclosed systems can reduce the effects of human error with regards to leaving children and/or pets in vehicles. Further, the disclosed systems may find use in litigation and claims settlement applications as the blockchain can provide a shared irreversible record of transaction among the nodes. This record can be helpful, for example, to original equipment manufacturers (OEMs) for liability purposes in situations where the nodes (e.g., guardian or daycare provider) provide false confirmations to transactions via their mobile devices. Embodiments of the disclosure can serve to improve parenting satisfaction with non-traditional door-opening systems for vehicles. Further, the disclosed systems may serve to enhance children's safety and home safety, for example, by alerting guardians regarding house or vehicle hacking attempts.

In some examples, the disclosed systems may perform a plausibility check to ensure that there is sufficient safe number of nodes on the network to complete critical transaction (e.g., a child's status in the vehicle) with at least one additional node serving as a "watch dog" node. For example, the disclosed systems can designate a minimum plausibility check involving a vehicle, father, and a mother, or a vehicle, a driver, and a daycare), or a vehicle, a driver, and a parent, and the like.

In some examples, if one of the endorsing nodes for a given transaction are temporarily unavailable, then an alternative limp-mode of operation may be activated. In the limp-mode of operation, adjacent nodes can provide their assessment and/or confirmation. Further, the disclosed systems may use AI to read the ledger and history to predict next node for obtaining such confirmation. In another aspect, a node that sent the transaction (for example, child is alone in the vehicle) can re-send the transaction multiple times with differed time intervals (e.g., 3 minutes, 2 minutes, 1 minute, etc.). In some cases, if there is no additional confirmation from other nodes, the disclosed systems can perform at least one action, for example, turn on an air-conditioning system of the vehicle, open the windows of the vehicle, honk the vehicle's horn, call references (e.g., a guardian or friend of a guardian), call a police station, or call an emergency service.

FIG. 1 shows an example usage scenario for increasing vehicle safety for passengers using blockchain, in accordance with example embodiments of the disclosure. In particular, house 102 may include various sensors and/or cameras that may detect individuals and animals entering and exiting the house and going to and from a vehicle. The disclosed systems may receive messages over a network 103 from devices associated with the house 102 that can report transactions describing such interactions between the individuals, animals, the house, and/or the vehicle. Further, the devices associated with the house 102 can send confirmation messages over a network 103 that may confirm other transactions generated by additional devices (to be shown and described further below). These confirmation messages may also be written to the blockchain 105 in order to provide a record of transactions in confirmations.

Vehicle 104 may include various devices (e.g., surveillance systems, cameras, wireless transceivers, vehicle seats with embedded sensors, and/or the like) that may detect individuals and animals entering and exiting the vehicle and going to and from the vehicle towards a given destination (e.g., A house 102, a daycare center 106, a store, and/or the like). The disclosed systems may receive messages over a network 103 from devices associated with the vehicle 104 that can report transactions describing such interactions between the individuals, animals, and the vehicle. Further, the devices associated with the vehicle 104 can send confirmation messages that may confirm other transactions generated by additional devices. These confirmation messages may also be written to the blockchain 105 in order to provide a record of transactions in confirmations. For example, the vehicle 104 may confirm a transaction generated by a surveillance system of the house 102 indicating that the child is traveling towards and/or entering the vehicle 104.

Vehicle seat 108 may include embedded sensors that may determine when a child sits on or leaves the vehicle seat. The vehicle seat 108 can therefore generate transactions describing the interaction between the child and the vehicle seat. Further, the vehicle seat 108 can send confirmation messages over a network 103 that may confirm other transactions generated by additional devices. These confirmation messages may also be written to the blockchain 105 in order to provide a record of transactions in confirmations. For example, the vehicle seat 108 may confirm a transaction generated by a vehicle 104 indicating that the child is entering the vehicle 104 after the child is seated in the vehicle seat 108.

User device 112 may be used by individuals (e.g., guardians and/or passengers of vehicles) to send confirmation messages over a network 103 that may confirm other transactions generated by additional devices. These confirmation messages may also be written to the blockchain 105 in order to provide a record of transactions in confirmations. For example, the individual may use a user device 112 to confirm a transaction generated by a vehicle 104 indicating that the child is entering the vehicle 104.

A location 114 may include various devices such as surveillance systems (e.g., similar to surveillance system 116) that may monitor the interactions of individuals including children. In particular, devices at the location 114 such as a daycare may be configured to transmit transactions over the network 103 indicative of a child entering the location 114 or exiting the location 114. In other examples, devices at the location 114 may transmit periodic transactions over the network 103 indicative of a child remaining at the location 114. Further, the devices of the location send confirmation messages over a network 103 that may confirm other transactions generated by additional devices. These confirmation messages may also be written to the blockchain 105 in order to provide a record of transaction confirmations. For example, a device at the location 114 may confirm a transaction generated by a vehicle 104 indicating that the child travelling towards a daycare.

Surveillance system 116 may be used in connection with a location 114, a vehicle 104, a house 102 and/or the like. In particular, the surveillance system 116 may monitor the activity of individuals at a given location, within vehicle, traveling to and from a vehicle, entering or exiting a house, and/or the like. The surveillance system 116 may also transmit transactions over the network 103 that can be written to blockchain 105. Additionally, surveillance system 116 may confirm transactions that were previously written by other devices to the blockchain 105. For example, the surveillance system of 116 associated with the house 102 can confirm a transaction indicating that the child is traveling towards and/or entering the house 102.

In some examples, the vehicle 104 may be any suitable vehicle such as a vehicle, truck, recreational vehicle (RV), boat, plane, etc., and may be equipped with suitable hardware and software that enables it to communicate over a network, such as a local area network (LAN).

In another embodiment, the vehicle 104 may include a variety of sensors that may aid the vehicle in determining its location, which may be helpful to determine the context in which the child may be (e.g., in a store parking lot, at home, at a daycare, etc.). The sensors may include radio detection and ranging (RADAR), light detection and ranging (LI-DAR), cameras, magnetometers, ultrasound, barometers, and the like. In one embodiment, the sensors and other devices of the vehicle 104 may communicate over a network connection. In other embodiments, the vehicle 104 and/or a delivery vehicle may communicate with the user at a user device using the network connection. Examples of suitable network connections include a controller area network (CAN), a media-oriented system transfer (MOST), a local interconnection network (LIN), a cellular network, a Wi-Fi network, and other appropriate connections such as those that conform with known standards and specifications (for example, one or more Institute of Electrical and Electronics Engineers (IEEE) standards, and the like).

In one embodiment, the vehicle 104 may include one or more magnetic positioning devices such as magnetometers, which may offer a location determination accuracy of about 1 to 2 meters with 90% confidence level, without using additional wireless infrastructure for positioning. In one embodiment, the magnetic positioning devices may be used to determine the elevation of the vehicle 104 or a delivery vehicle such as a UAV. Alternatively or additionally, a barometer device may be used to determine the elevation of the vehicle 104 or the delivery vehicle. In another embodiment, barometers and pressure altimeters may be a part of the vehicle and may measure pressure changes caused by a change in altitude of the vehicle 104.

In one embodiment, the vehicle 104 may use one or more inertial measurement devices (not shown) to determine the vehicle's position. The vehicle 104 may use dead reckoning and other approaches for positioning of the vehicle using an inertial measurement unit carried by the vehicle 104, sometimes referring to maps or other additional sensors to constrain the inherent sensor drift encountered with inertial navigation. In one embodiment, one or more microelectromechanical systems (MEMS) based inertial sensors may be used in the inertial measurement unit of the vehicle 104; however, the MEMS sensors may be affected by internal noises which may result in cubically growing position error with time. In one embodiment, to reduce the error growth in such devices, a Kalman filtering based approach may be used, by implementing software algorithms on software modules associated with the various devices in the vehicle 104.

In one embodiment, the inertial measurements may cover one or more differentials of motion of the vehicle 104, and therefore, the location may be determined by performing integration functions in the software modules, and accordingly, may require integration constants to provide results. Further, the position estimation for the vehicle 104 may be determined as the maximum of a two-dimensional or a three-dimensional probability distribution which may be recomputed at any time step, taking into account the noise model of all the sensors and devices involved obstacles (for example, other vehicles and pedestrians), Based on the vehicle's 104 motion, the inertial measurement devices may be able to estimate the vehicle's 104 locations by one or more AI-based algorithms, for example, one or more machine learning algorithms.

In another aspect, diagram 100 shows satellite 130 and one or more cellular towers 132. In another embodiment, the vehicle 104 may include a transceiver, which may in turn may include one or more location receivers (for example, GPS receivers) that may receive location signals (for example, GPS signals) from one or more satellites 130. In another embodiment, a GPS receiver may refer to a device that can receive information from GPS satellites (for example, satellites 130) and calculate the vehicle's 104 geographical position.

In various embodiments, the GPS receiver may be configured to use an L5 frequency band (for example, centered at approximately 1176.45 MHz) for higher accuracy location determination (for example, to pinpoint the vehicle 104 to approximately one-foot accuracy). In another embodiment, the location device may include the capability to detect location signals from one or more non-GPS based systems, for example, to increase the location accuracy determination. For example, the location device may be configured to receive one or more location signals from a Russian global navigation satellite system (GLONASS), a Chinese BeiDou navigation satellite system, a European Union Galileo positioning system, an Indian regional navigation satellite system (IRNSS), and/or a Japanese quasi-zenith satellite system, and the like.

As noted, the nodes (e.g., the vehicle 104, devices of the house 102, the surveillance system 116, etc.) may be configured to communicate over a network 103, wirelessly or wired. The network 216 may include, but not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Further, the nodes (e.g., the vehicle 104, devices of the house 102, the surveillance system 116, etc.) may include any suitable radio and/or transceiver for transmitting and/or receiving radio frequency (RF) signals in the bandwidth and/or channels corresponding to the communications protocols utilized by any of the user device and/or the vehicle devices to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (for example, white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2:
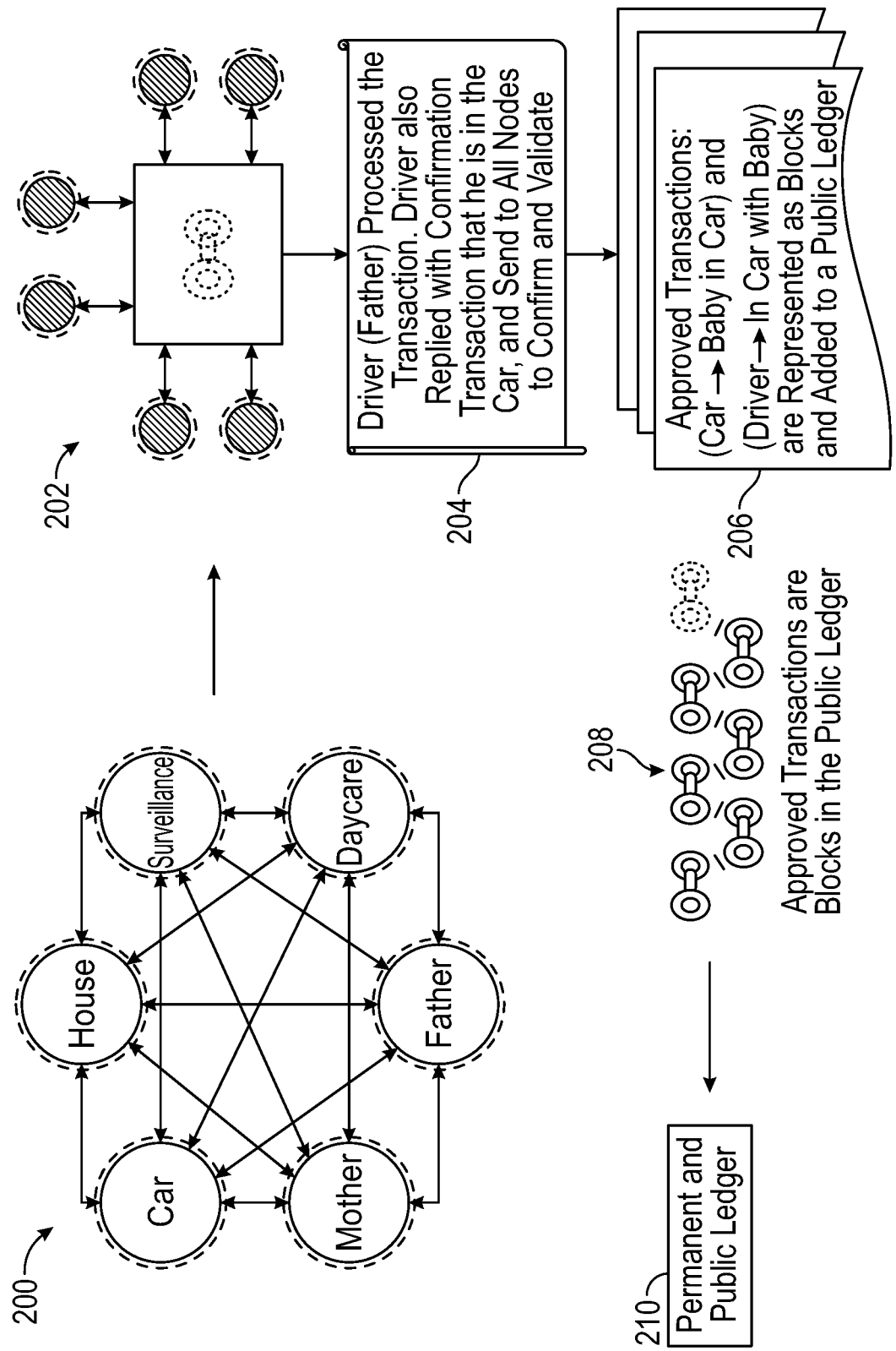
FIG. 2 shows a diagram representing how blockchain can be used to record safety-related transactions via devices on a network, in accordance with example embodiments of the disclosure.

FIG. 2 shows a diagram representing how blockchain can be used to record safety-related transactions via devices on a network, in accordance with example embodiments of the disclosure. Diagram 200 shows a representation of a network of nodes that can monitor the status of an individual (e.g., a child) or an animal (e.g., a pet) during their various interactions with a vehicle, a house, and location of interest such as a daycare, surveillance systems, and guardians. In particular diagram 200 shows various elements that are similar to the elements shown and described in connection with FIG. 1, above. The nodes can communicate with one another over a network (e.g., a peer-to-peer network) and can generate transactions in confirmations of the transactions, which can be written to a blockchain.

In some examples, diagram 202 shows a transaction that can be funneled into a network and broadcasted to devices associated with each node. For example, a surveillance system can generate a transaction which may be indicative of a child entering a vehicle. This transaction may be broadcast to devices associated with a mother and a father of the child, a device of a house, devices at daycares, etc. Further, more nodes that are in proximity to the surveillance system may generate confirmation messages for the transactions that confirm the child entering the vehicle. For example, a guardian such as a mother or a father of the child can generate a confirmation message that confirm that the child is entering the vehicle. These confirmation messages can also be written to the blockchain.

At stage 204, a driver such as the father can process a vehicles transaction. Further the driver can also reply with the confirmation transaction that the drivers in the vehicle. This transaction can be transmitted to all other nodes on the network to confirm and validate the transaction.

At stage 206, approved transactions (e.g., transactions that have been confirmed by other nodes in the network) can be represented as blocks and added to the blockchain which represents a public ledger. For example, such approved transactions may include a transaction generated by the vehicle that the child is in the vehicle and/or a transaction generated by the device of the driver, the transaction indicative of the driver being in the vehicle with the child.

As noted, at stage 208, the confirmed and approved transactions can represent additional blocks that are added to the blockchain serving as a public ledger. At stage 210, these additional blocks become part of the permanent public ledger.

Figure 3:
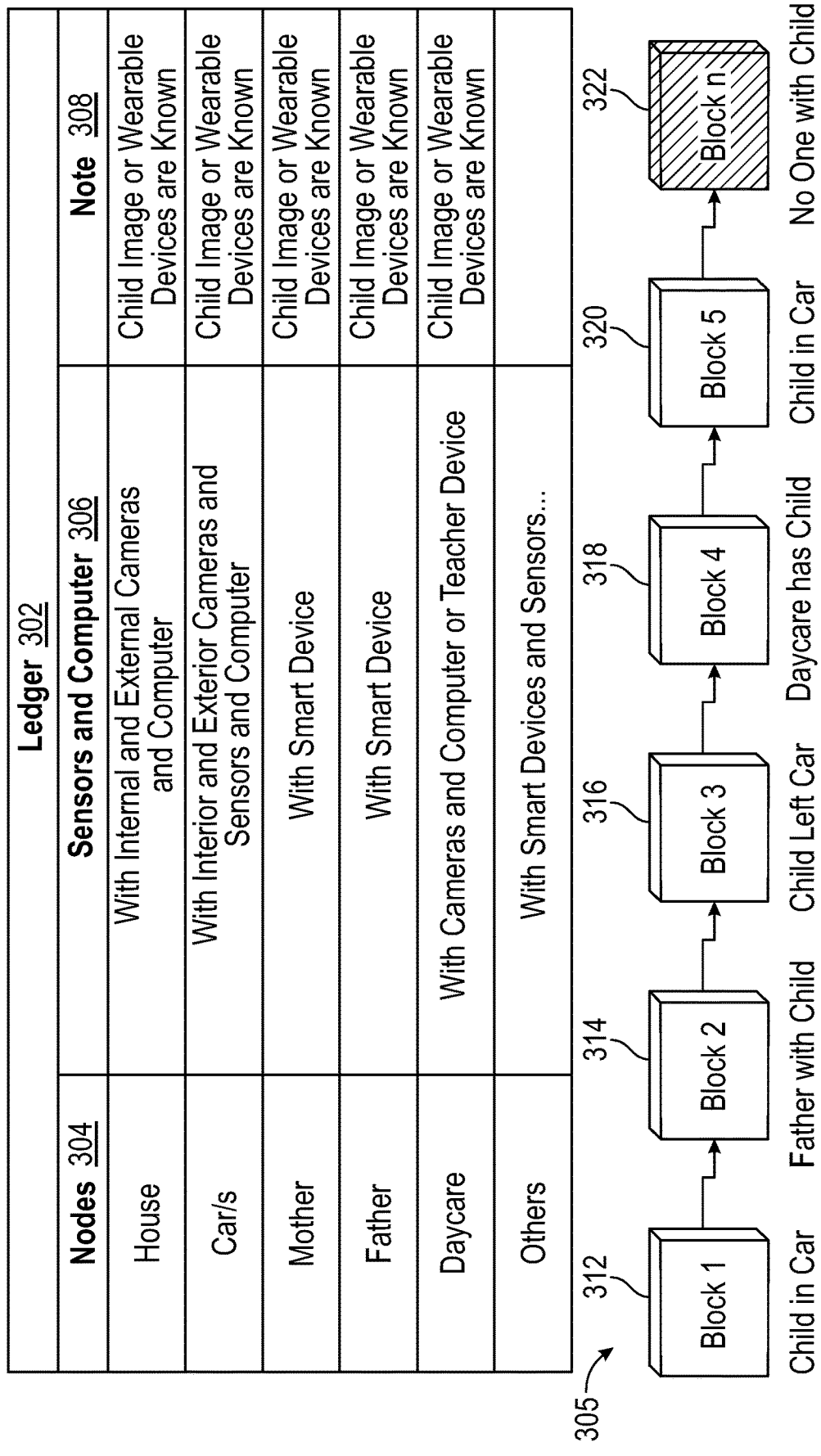
FIG. 3 shows a table including blockchain entries and an abstraction of a blockchain representing the states of supervision of a child, in accordance with example embodiments of the disclosure.

FIG. 3 shows a table including blockchain entries and an abstraction of a blockchain representing the states of supervision of a child, in accordance with example embodiments of the disclosure. Diagram 300 includes a table representing an example ledger 302 (serving is a blockchain). Ledger 302 can represent nodes 304, sensors and computers 306, and various related notes 308. The nodes 304 can include various entities such as houses, vehicles, guardian such as mothers and fathers, location such as a daycare, and other nodes having smart devices and/or sensors.

The sensors and computers 306 may represent various means of observing individuals (e.g., children) and animals (e.g., pets) interacting with vehicles and/or locations. For example, the house may be equipped with internal and external cameras and computers that can observe the individuals and animals interacting with vehicles and/or locations. The vehicle may be equipped with interior and exterior cameras, sensors, and computers that may observe the individuals and animals interacting with the vehicle. A guardian such as a mother or father may be equipped with a smart device such as a cell phone to monitor individuals and animals interacting with the vehicle and/or locations. They location such as a daycare may include cameras, computers, or devices associated with staff (such as teacher devices) that may monitor individuals and animals interacting with the vehicle and/or locations.

As described in the notes 308 section, these sensors and computers 306 may operate under the assumption that individuals such as children can be recognized from an image or a wearable device that the individuals have on their person (e.g., a mobile phone). Further, the nodes 304 can use the sensors and computers 306 to generate transactions and confirmations of the transactions that can be written to the blockchain, as depicted in diagram 305.

In particular, diagram 305 represents an example whereby at stage 312, a transaction can be written to a first block 1 that represents a child entering the vehicle. At stage 314, a second transaction can be written to a second block 2 that represents a guardian being with the child. At stage 316, a third transaction can be written to a third block 3 that represents a child leaving the vehicle. At stage 318, a fourth transaction can be written to a second block 4 that represents a daycare having the child. At stage 320, a fifth transaction can be written to a fifth block 5 that represents a child being in the vehicle again after being in the daycare. However, at stage 322, a transaction may be generated at a later block (e.g., block n, where n represents a positive integer greater than 5) that represents that there is no guardian with the child (for example, because the child has been left alone in the vehicle without parental supervision). Accordingly, the disclosed systems may generate at least one action based on the results of stage 322 indicating that there is no guardian with the child.

Figure 4:
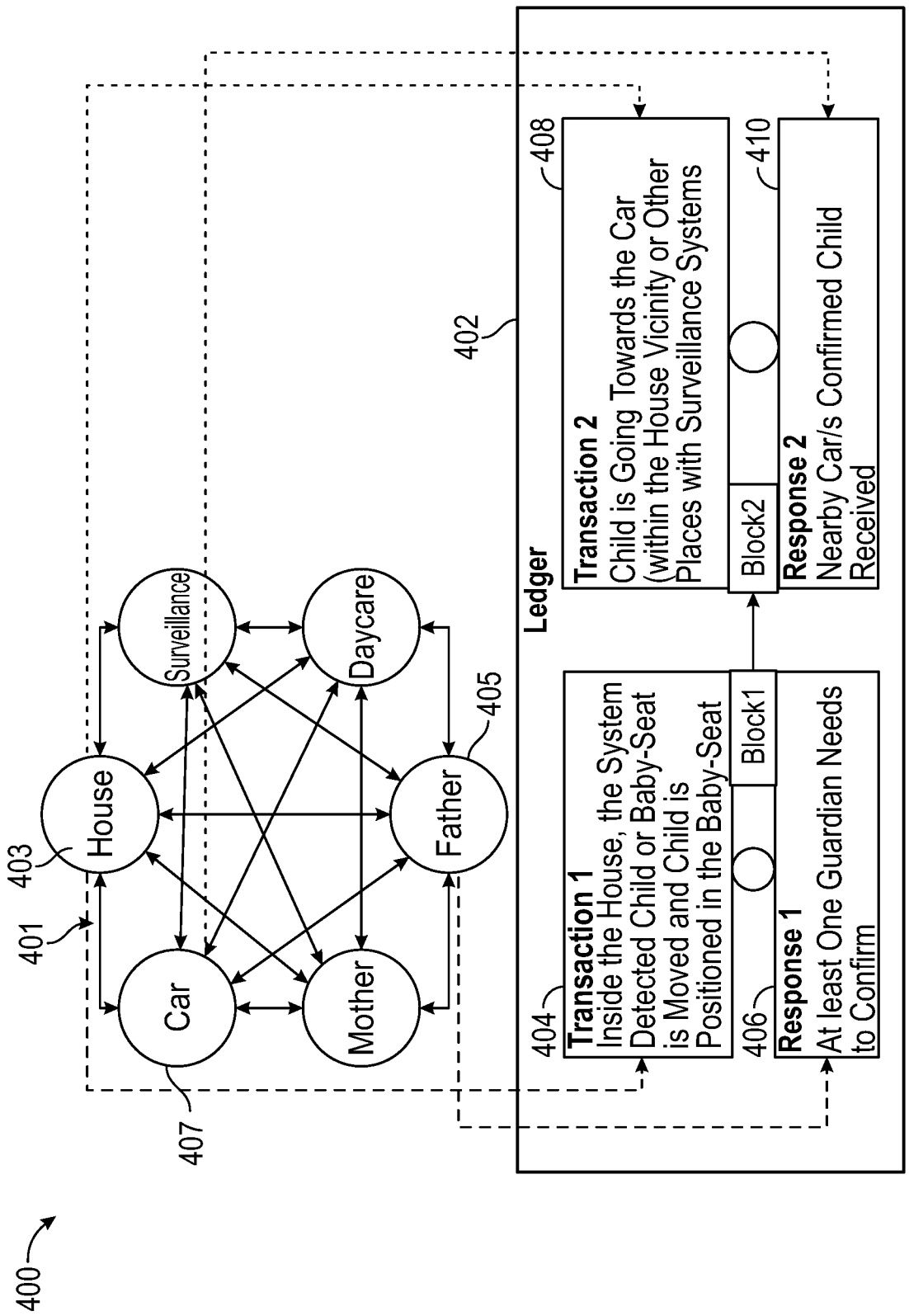
FIG. 4 shows an example diagram representing a blockchain ledger recording example transactions and associated responses from users at different nodes of a network, in accordance with example embodiments of the disclosure.

FIG. 4 shows an example diagram representing a blockchain ledger recording example transactions and associated responses from users at different nodes of a network, in accordance with example embodiments of the disclosure. Diagram 400 represents a network 401 of nodes that can publish transactions in responses with a ledger 402 (e.g., a blockchain). In particular, network 401 includes nodes such as a house 403 and a father 405. The house 403 can have a system that can detect activities associated with the child and publish a first transaction 1 404 to the ledger 402. Transaction 1 404 can include a description that inside the house, the system detected that a child and/or a baby seat has moved and that the child is positioned in the baby seat. This description may indicate that the father is positioning the child into the baby seat to seat the child in the vehicle at a later time. Accordingly, the disclosed systems may generate a confirmation necessitating a response such as response 1 406 indicating that at least one guardian (e.g., the father) may need to confirm that the child is positioned in the baby seat. Both transaction 1 404 and response 1 406 may be written to the ledger 402 at block 1.

The vehicle 407 can have a system that can detect activities associated with the child and publish a second transaction 2 408 to the ledger 402. Transaction 2 408 can include a description that the child is moving towards the vehicle. Further, the description can indicate that the child is within a predetermined proximity to the house and any suitable location having a surveillance system). Accordingly, the disclosed systems may generate a confirmation necessitating a response such as response 2 410 indicating that nearby vehicles may need to confirm that the child is near moving towards the vehicle. Both transaction 2 408 and response 2 410 may be written to the ledger 402 at block 2.

Figure 5:
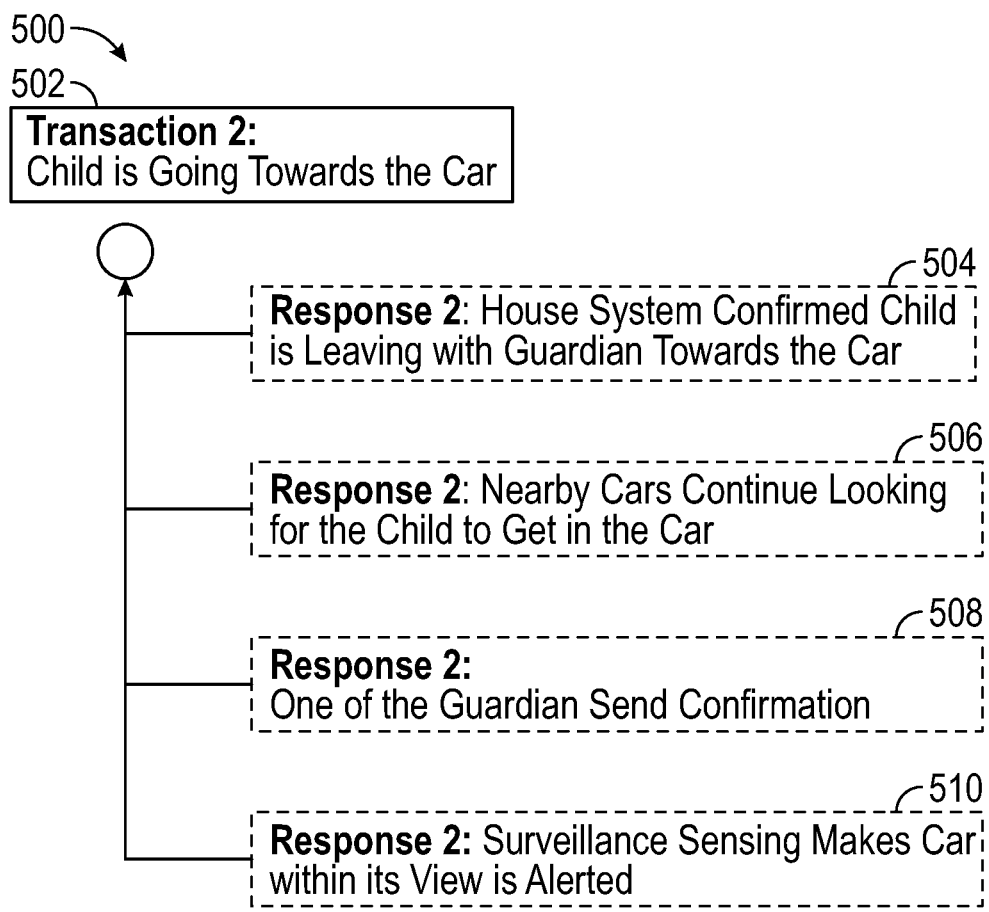
FIG. 5 shows an example diagram representing an example blockchain transaction of a child going towards a vehicle along with representative responses from users and devices at different nodes of a network, in accordance with example embodiments of the disclosure.

FIG. 5 shows an example diagram representing an example blockchain transaction of a child going towards a vehicle along with representative responses from users and devices at different nodes of a network, in accordance with example embodiments of the disclosure. In particular, diagram 500 shows, at stage 502, transaction 2 indicative of a child going toward a vehicle. This transaction can be written to the blockchain. Further, a series of responses from different nodes can also be written to the blockchain, as detailed below. These responses may include various confirmations via responses generated by individuals having devices at the nodes or systems that automatically generate response messages using AI-based algorithms.

For example, at stage 504, a response 2 can be generated by a house system (e.g., a security system of the house), the response indicative of the house system confirming that the child is leaving with the guardian towards the vehicle. This response may be written to the blockchain. Further, additional nodes may confirm the continuation of the process of the child's travel to the vehicle. For example, at stage 506, nearby vehicles may continue observing the child as the child enters the vehicle. These nearby vehicles may provide responses that may be written to the blockchain. Moreover, at stage 508, a response 2 message can include one of the guardians sending a confirmation message to a prompt received at the guardian's mobile device. The confirmation may indicate that the guardians confirm that their child has entered the vehicle. Again, this response message may be written to the blockchain in order to have a permanent record of the confirmation by the guardians. At stage 510, the disclosed systems may generate a response 2 message, which may be transmitted to a surveillance system such that the surveillance system changes its field of view to better observe the vehicle. Again, this response may be written to the blockchain.

Figure 6:
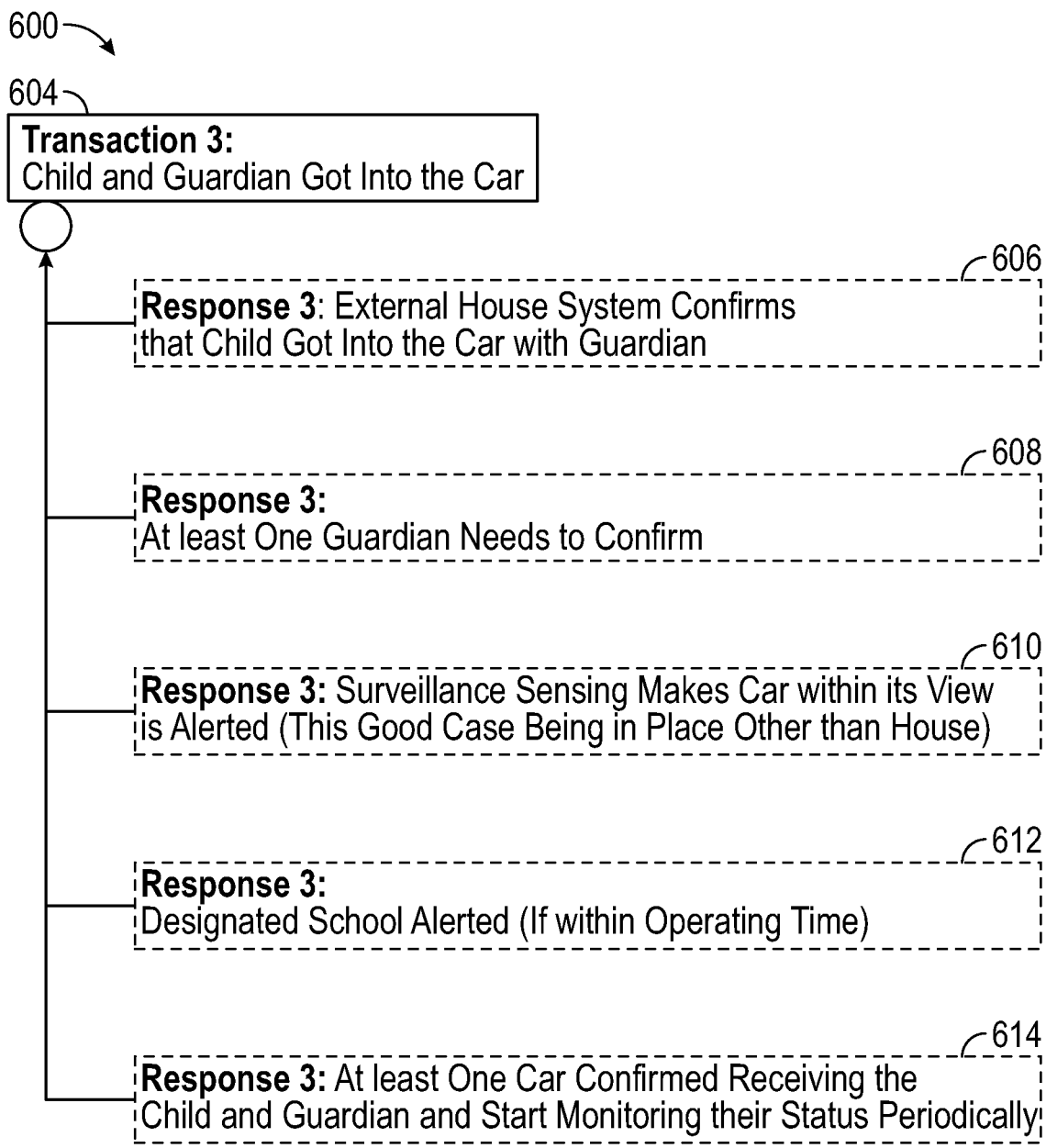
FIG. 6 shows another example diagram representing an example blockchain transaction of a child and guardian entering the vehicle along with representative responses from users and devices at different nodes of the network, in accordance with example embodiments of the disclosure.

FIG. 6 shows another example diagram representing an example blockchain transaction of a child and guardian entering the vehicle along with representative responses from users and devices at different nodes of the network, in accordance with example embodiments of the disclosure.

Diagram 600 shows, at stage 604, transaction 3 indicative of the child and the guardian entering the vehicle. This transaction can be written to the blockchain. Further, a series of responses from different nodes can also be written to the blockchain, as detailed below. These responses may include various confirmations via responses generated by individuals having devices at the nodes or systems that automatically generate response messages using AI-based algorithms.

For example, at stage 606, a response 3 can be generated by a house system (e.g., a security system of the house), the response indicative of the house system confirming that the child entered the vehicle with the guardian. This response may be written to the blockchain. Further, additional nodes may confirm the continuation of the process of the child's entry to the vehicle.

Moreover, at stage 608, a response 3 message can include one of the guardians sending a confirmation message to a prompt received at the guardian's mobile device. The confirmation may indicate that the guardians confirm that their child has entered the vehicle. Again, this response message may be written to the blockchain in order to have a permanent record of the confirmation by the guardians.

At stage 610, the disclosed systems may generate a response 3 message, which may be transmitted to a surveillance system such that the surveillance system changes its field of view to better observe the vehicle. This surveillance system may be at a location other than the house (for example, a store or daycare-based surveillance system). This response may be written to the blockchain.

At stage 612, if the travel is occurring within a predetermined operating time window, the disclosed systems may generate a response 3 message, which may be transmitted to a designated school to alert the designated school that the child is on the way to the school. This response may be written to the blockchain.

At stage 614, at least one vehicle can periodically monitor the status of the child in the guardian in the vehicle and may generate a response 3 message confirming that the child in guardian or in the vehicle periodically. These responses may be written to the blockchain.

Figure 7:
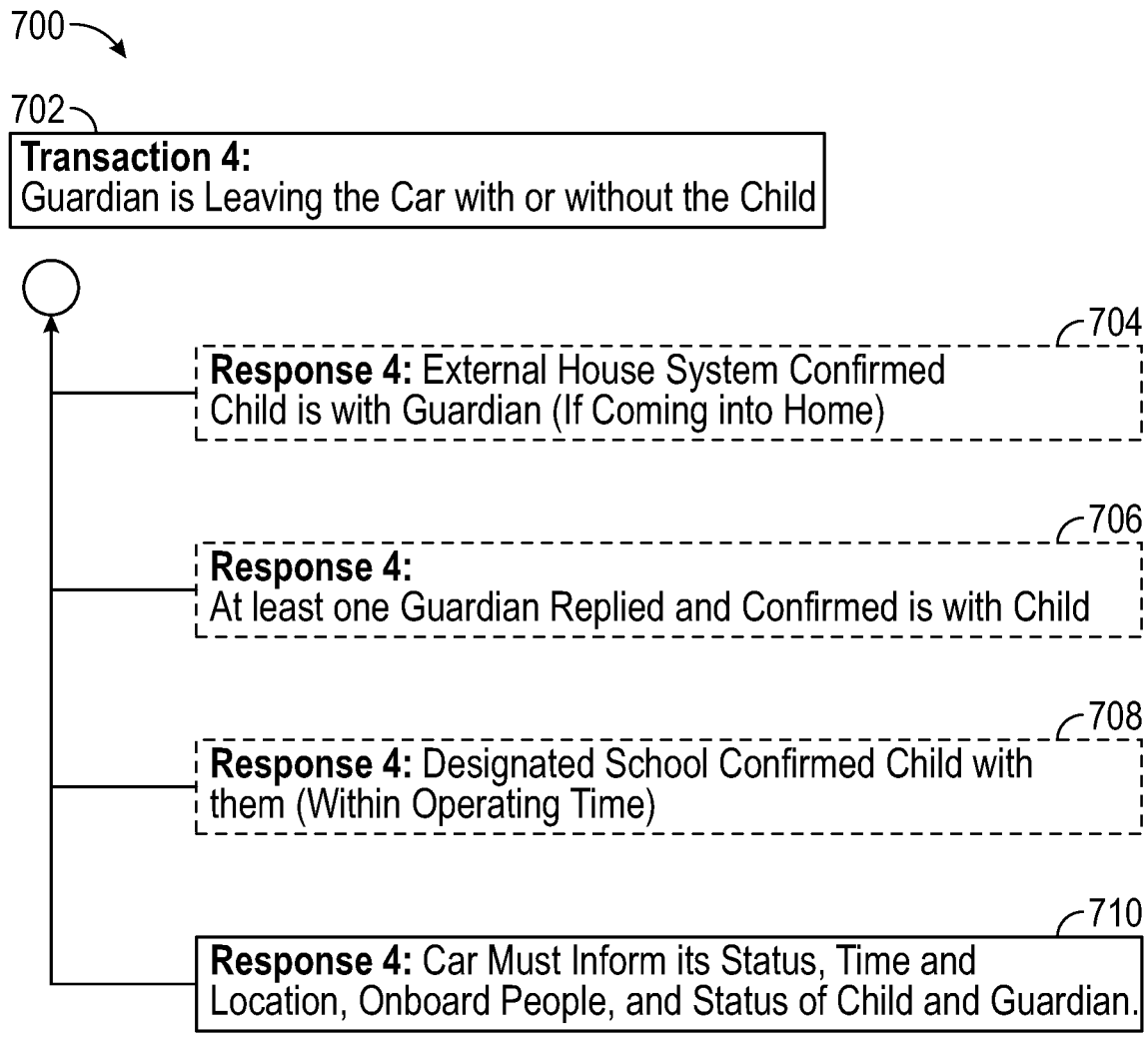
FIG. 7 shows another example diagram representing an example blockchain transaction of a guardian leaving the vehicle without the child along with representative responses from users and devices at different nodes of the network, in accordance with example embodiments of the disclosure.

FIG. 7 shows another example diagram representing an example blockchain transaction of a guardian leaving the vehicle without the child along with representative responses from users and devices at different nodes of the network, in accordance with example embodiments of the disclosure. Diagram 700 shows, at stage 702, transaction 4 indicative of the guardian leaving the vehicle with or without the child. This transaction can be written to the blockchain. Further, a series of responses from different nodes can also be written to the blockchain, as detailed below. These responses may include various confirmations via responses generated by individuals having devices at the nodes or systems that automatically generate response messages using AI-based algorithms.

For example, at stage 704, a response 4 can be generated by a house system (e.g., a security system of the house), the response indicative of the house system confirming that the child is entering the home with the guardian. This response may be written to the blockchain. Further, additional nodes may confirm the continuation of the process of the child's entry to the home with the guardian. Moreover, at stage 706, a response 4 message can include one of the guardians sending a confirmation message to a prompt received at the guardian's mobile device. The confirmation may indicate that the guardians confirm that their child has entered the home. Again, this response message may be written to the blockchain in order to have a permanent record of the confirmation by the guardians.

In other cases, the child may not necessarily be with the guardian but may be with the designated entity such as a school. For example, at stage 708, a response 4 can be generated by a device at designated school, the response confirming that the child is at the school within a given operating time window (e.g., for afterschool activities). This message can be written to the blockchain.

In some cases, at stage 710, a response 4 may be generated by a vehicle that periodically writes its status to the blockchain. In particular, the message may include the vehicle status, time and location, the identities of the individuals that are on board the vehicle, the status of any children and guardians in the vehicle, and/or the like.

Figure 8:
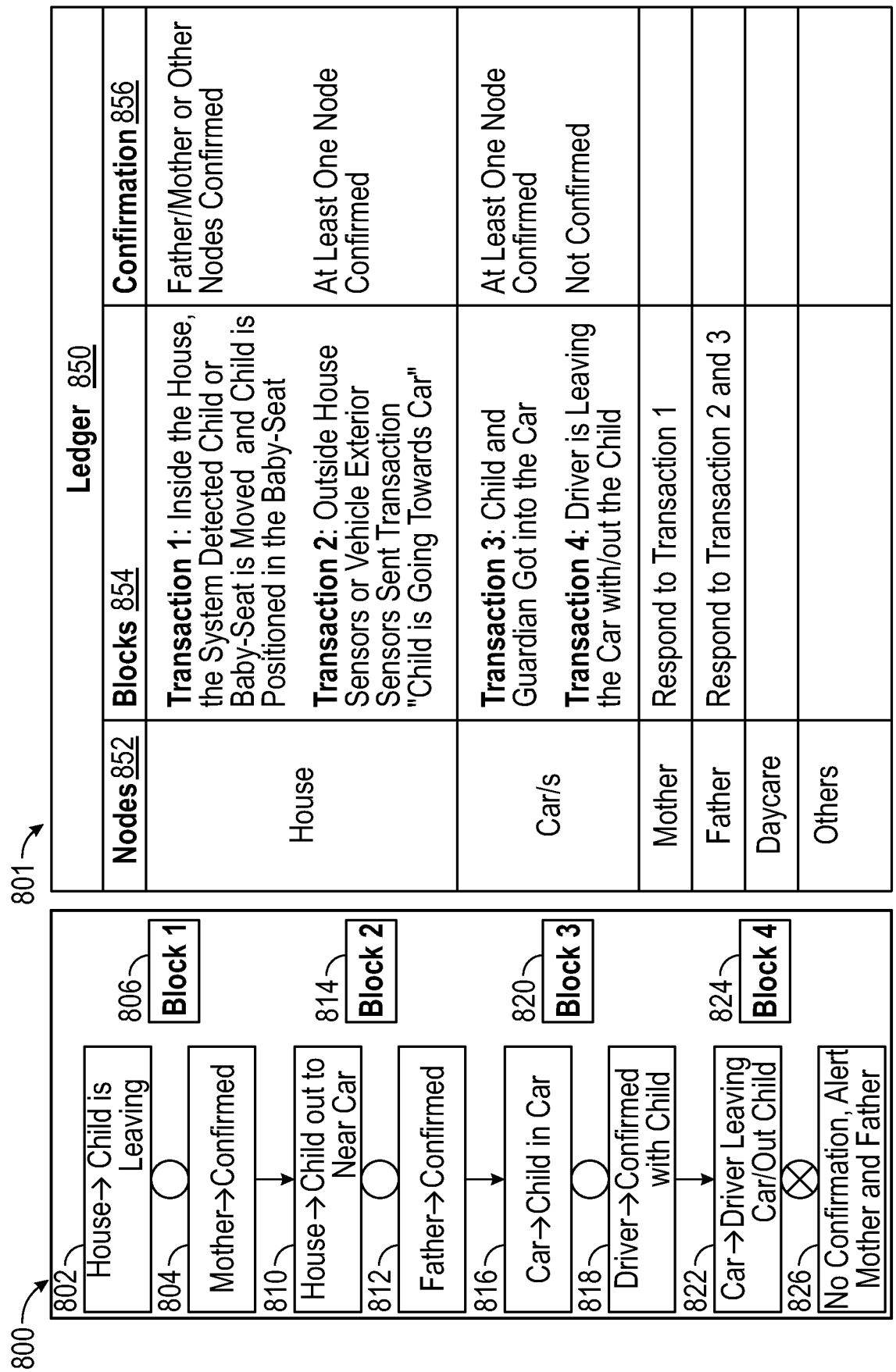
FIG. 8 shows another example diagram representing a visualization of blockchain transactions and a table of a ledger recording example nodes and associated transactions and state confirmation from users at different nodes of a network, in accordance with example embodiments of the disclosure.

FIG. 8 shows another example diagram representing a visualization of blockchain transactions and a table of a ledger recording example nodes and associated transactions and state confirmation from users at different nodes of a network, in accordance with example embodiments of the disclosure. Example diagram 800 can represent a visualization of blockchain transactions. At stage 802, a node such as a device associated with the house can post a transaction indicating that the child is leaving the house. At stage 804, other nodes (e.g., other user devices belonging to relatives of the child) may confirm the transaction generated at stage 802. Accordingly, the results of this transaction may be recorded to block 1 806.

At stage 810, the node associated with the house can post the transaction indicating that the child is near the vehicle. Further, at stage 812, a different node (e.g., a father of the child using a mobile phone or similar device) can confirm the transaction. Accordingly, the results of this transaction may be recorded to block 2 814.

At stage 816, the node associated with the vehicle can post the transaction indicating that the child is in the vehicle. Further, at stage 818, a different node (e.g., a driver of the vehicle using a mobile phone or similar device) can confirm the transaction. Accordingly, the results of this transaction may be recorded to block 3 820.

At stage 822, the node associated with the vehicle can post the transaction indicating that the driver is leaving the vehicle without the child. Further, at stage 826, a determination can be made that none of the nodes confirmed the transaction. Accordingly, the results of this transaction and the lack of confirmation may be recorded to block 4 824. Further, the guardian (e.g., mother or father) of the child may be alerted as to the state of the child in the vehicle (e.g., via a message to the guardians' mobile devices).

The recording of these transactions is represented further in ledger 850. In particular, ledger 850 includes nodes 852, blocks 854, and confirmation 856. In this case, the node can include the house, and the house can record a first transaction (transaction 1) describing that inside the house, the system detected that the child or a baby seat has moved, and that the child is positioned in the baby seat. The house can further record a second transaction (transaction 2) describing that sensors outside the house or sensors on the vehicle exterior transmitted a transaction that the child is going towards the vehicle. Further, ledger 850 may include a confirmation 856 that the father and/or the mother of the child (or other nodes and associated devices) have confirmed the occurrence of the first transaction 1. Moreover ledger 850 may include a confirmation that at least one node confirmed transaction 2.

Further, the node can include the vehicle, and the vehicle can record a third transaction (transaction 3) describing that the child and guardian entered the vehicle. The vehicle can further record a fourth transaction (transaction 4) describing that the driver is leaving the vehicle without the child. Further, ledger 850 may include a confirmation 856 that at least one node confirmed the occurrence of the third transaction 3. Moreover ledger 850 may include a confirmation that no nodes confirmed transaction 4.

The blocks can further indicate that the mother responded to transaction 1, and that the father responded to transactions 2 and 3. In this case, the daycare and other nodes do not provide input because the child was left in the vehicle alone.

Figure 9:
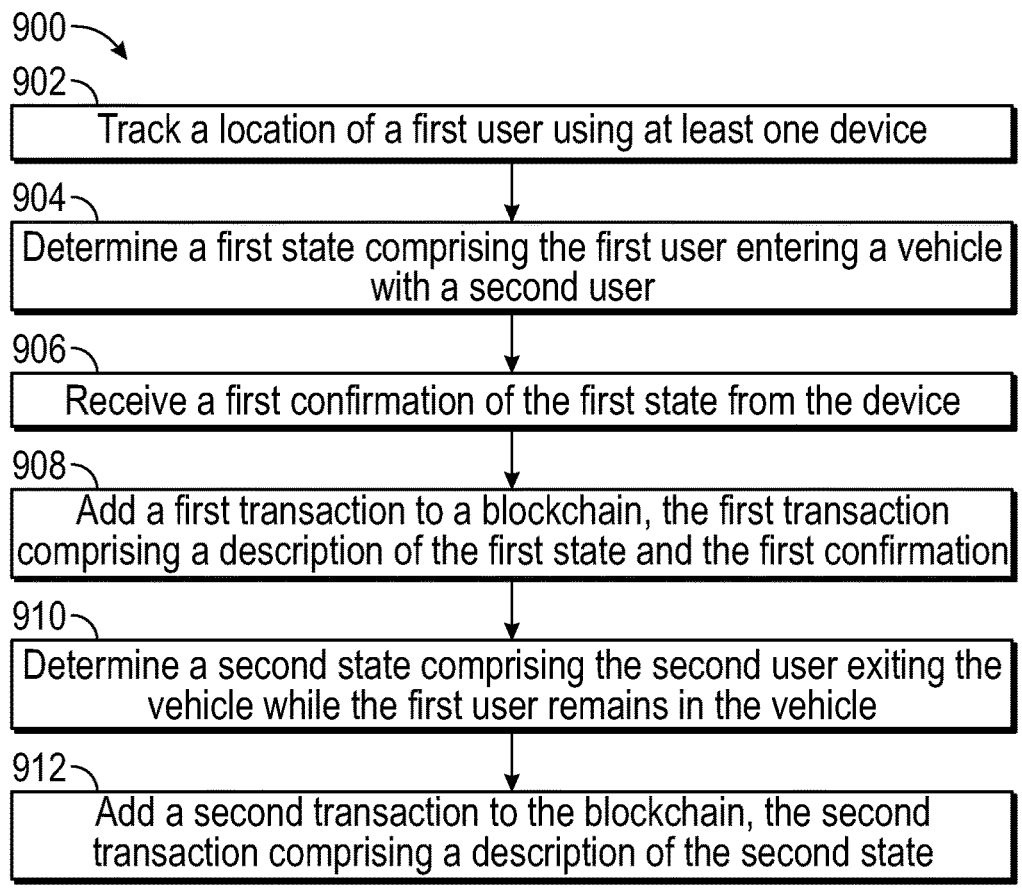
FIG. 9 show example process flows describing a method that may increase vehicle safety for passengers using blockchain, in accordance with example embodiments of the disclosure.

FIG. 9 shows an example process flow describing a method of potentially enhanced vehicle safety for passengers using blockchain, in accordance with example embodiments of the disclosure. At block 902, the method can include tracking a location of a first user using at least one device. The device can include a mobile phone, a security system, or a camera system.

Tracking the location of the first user can include determining a first location of the first user by the device and determining a second location of the first user by a second device. The location can include a residence of the first user or the second user, a daycare for the first user, or a store.

At block 904, the method can include determining a first state comprising the first user entering a vehicle with a second user. The disclosed systems can use any available systems (e.g., surveillance systems, cameras, etc.) along with AI-based techniques to determine that the first user enters the vehicle with the second user. Non-limiting examples include pose-estimation, computer vision algorithms, and the like.

At block 906, the method can include receiving a first confirmation of the first state from the device. The confirmation can be received via a text message or a response to a prompt received on a user device.

At block 908, the method can include adding a first transaction to a blockchain, the first transaction comprising a description of the first state and the first confirmation. The description can include a location associated with the first state, a description of the activities associated with the first state (e.g., child walking towards the car, etc.), and the like. The description can be textual, audio-based, or video-based.

At block 910, the method can include determining a second state comprising the second user exiting the vehicle while the first user remains in the vehicle. The determination can be made using any suitable AI-based technique. For example, the sensors of the vehicle may be configured to detect that the driver has left while the passenger remains. The method further includes performing at least one action, the action comprising transmitting a message to a second device, the message indicative of the second state. The action can include at least one of turning on a climate control system of the vehicle, opening a window of the vehicle, activating a security system of the vehicle, or transmitting a vehicle-to-everything (V2X) message to the second device, the V2X message indicative of the second state. V2X communication can include the passing of information from a vehicle to any entity that may affect the vehicle, and vice versa.

At block 912, the method can include adding a second transaction to the blockchain, the second transaction comprising a description of the second state. The description of the first state or the description of the second state can include the first location or the second location. In some cases, method can further include transmitting a second message to a second device, the second message indicating of the second state, receiving a second confirmation of the from the device, and adding a third transaction to the blockchain, the third transaction comprising the second state and the second confirmation.

Further, as noted, the devices and systems (and their various components) described herein can employ AI to facilitate the multimodal delivery and other features described herein. The components can employ various AI-based schemes for carrying out various embodiments and/or examples disclosed herein. To provide for or aid in the numerous determinations (for example, determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data. For example, the AI can be used to determine the possibility and/or preferability of making a delivery of an item to a particular location.

Such determinations can result in the construction of new events or actions from a set of observed events and/or stored event data, whether the events are correlated in close temporal proximity, and whether the events and data come from one or several event and data sources (for example, different sensor inputs). Components disclosed herein can employ various classification (explicitly trained (for example, via training data) as well as implicitly trained (for example, via observing behavior, preferences, historical information, receiving extrinsic information, etc.)) schemes and/or systems (for example, support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations. In some examples, the training may involve using data associated with previously successful and unsuccessful deliveries of an item to a location to train the AI-based techniques in order to improve the likelihood of successful item delivery by the delivery vehicles and/or the AVs, A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (for example, factoring into the analysis utilities and costs) to determinate an action to be automatically performed. In some examples, the disclosed systems may use a classifier to classify an item delivery by a delivery vehicle as being possible or not-easily possible, and/or to classify the item delivery by the delivery vehicle as being preferable or not preferable. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 10:
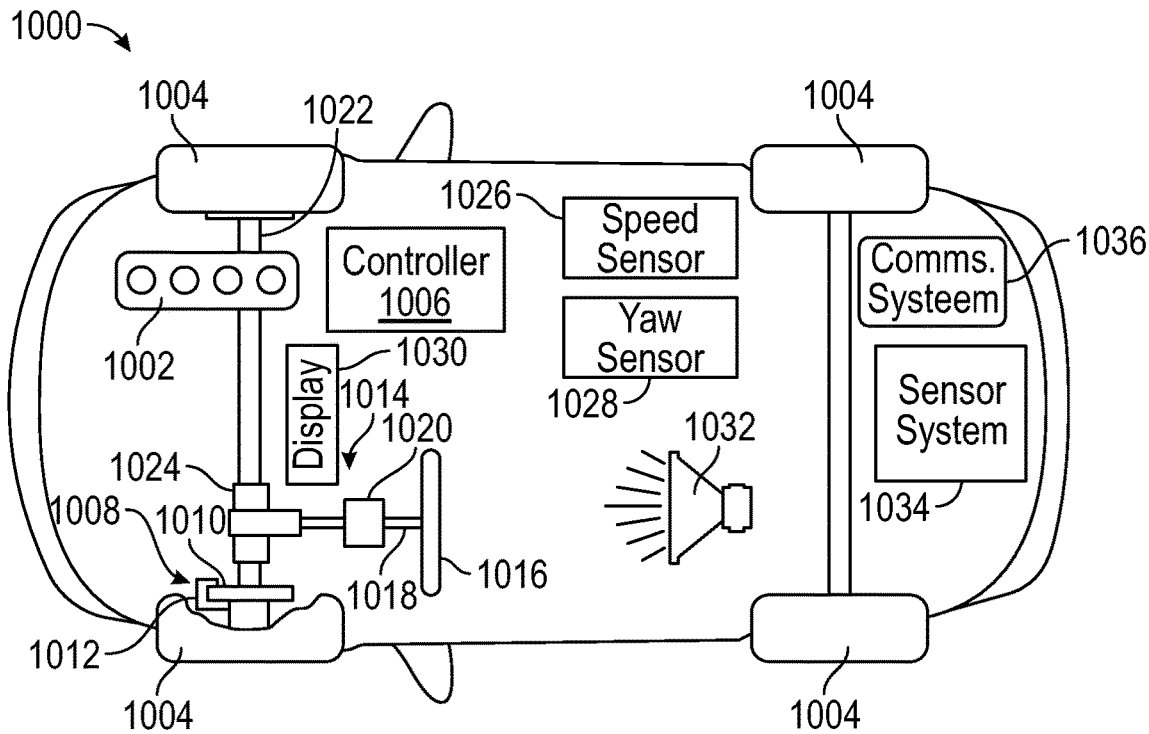
FIG. 10 is a schematic illustration of an example autonomous vehicle (AV) that may increase vehicle safety for passengers using blockchain using the disclosed systems and methods, in accordance with one or more embodiments of the disclosure.

FIG. 10 is a schematic illustration of an example autonomous vehicle in accordance with one or more embodiments of the disclosure. In particular, the vehicle (for example, vehicle 104 shown and described in connection with FIG. 1, above), may include an AV. Referring to FIG. 10, an example AV 1000 may include a power plant 1002 (such as a combustion engine and/or an electric motor) that provides torque to driven wheels 1004 that propel the vehicle forward or backward.

Autonomous vehicle operation, including propulsion, steering, braking, navigation, and the like, may be controlled autonomously by a vehicle controller 1006. For example, the vehicle controller 1006 may be configured to receive feedback from one or more sensors (for example, sensor system 1034, etc.) and other vehicle components to determine road conditions, vehicle positioning, and so forth. The vehicle controller 1006 may also ingest data form various sensors such as speed monitor and yaw sensor, as well as the tires, brakes, motor, and other vehicle components. The vehicle controller 1006 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (for example, to control steering wheel operation, acceleration pedal, brake pedal, etc.), and so forth. The controller 1006 may be configured to interact with the user by communicating with the user's user device.

The vehicle controller 1006 may include one or more computer processors coupled to at least one memory. The vehicle 1000 may include a braking system 1008 having disks 1010 and calipers 1012. The vehicle 1000 may include a steering system 1014. The steering system 1014 may include a steering wheel 1016, a steering shaft 1018 interconnecting the steering wheel to a steering rack 1020 (or steering box). The front and/or rear wheels 1004 may be connected to the steering rack 1020 via axle 1022. A steering sensor 1024 may be disposed proximate the steering shaft 1018 to measure a steering angle. The vehicle 1000 also includes a speed sensor 1026 that may be disposed at the wheels 1004 or in the transmission. The speed sensor 1026 is configured to output a signal to the controller 1006 indicating the speed of the vehicle. A yaw sensor 1028 is in communication with the controller 1006 and is configured to output a signal indicating the yaw of the vehicle 1000.

The vehicle 1000 includes a cabin having a display 1030 in electronic communication with the controller 1006. The display 1030 may be a touchscreen that displays information to the passengers of the vehicle and/or functions as an input. A person having ordinary skill in the art will appreciate that many different display and input devices are available and that the present disclosure is not limited to any particular display. An audio system 1032 may be disposed within the cabin and may include one or more speakers for providing information to users that pickup items. The audio system 1032 may also include a microphone for receiving voice inputs or detecting sounds at the residence (for example, animal sounds). The vehicle may include a communications system 1036 that is configured to send and/or receive wireless communications via one or more networks. The communications system 1036 may be configured for communication with devices in the vehicle or outside the vehicle, such as a user's device, the delivery vehicles, etc.

The vehicle 1000 may also include a sensor system for sensing areas external to the vehicle, such as user residences, animals, users, driveways, and the like (shown and described in connection with FIG. 1, above). The sensor system may include a plurality of different types of sensors and devices such as cameras, ultrasonic sensors, RADAR, LIDAR, microphones, and/or combinations thereof. The sensor system may be in electronic communication with the controller 1006 for controlling the functions of various components. The controller may communicate via a serial bus or via dedicated electrical conduits. The controller generally includes any number of microprocessors, ASICs, ICs, memory (for example, FLASH, ROM, RAM, EPROM and/or EEPROM) and software code to co-act with one another to perform a series of operations. The controller also includes predetermined data, or "look up tables" that are based on calculations and test data and are stored within the memory. The controller may communicate with other vehicle systems and controllers over one or more wired or wireless vehicle connections using common bus protocols (for example, CAN and LIN). Used herein, a reference to "a controller" refers to one or more controllers and/or computer processors. The controller 1006 may receive signals from the sensor system 1034 and may include memory containing machine-readable instructions for processing the data from the sensor system. The controller 1006 may be programmed to output instructions to at least the display 1030, the audio system 1032, the steering system 1014, the braking system 1008, and/or the power plant 1002 to autonomously operate the vehicle 1000.

Figure 11:
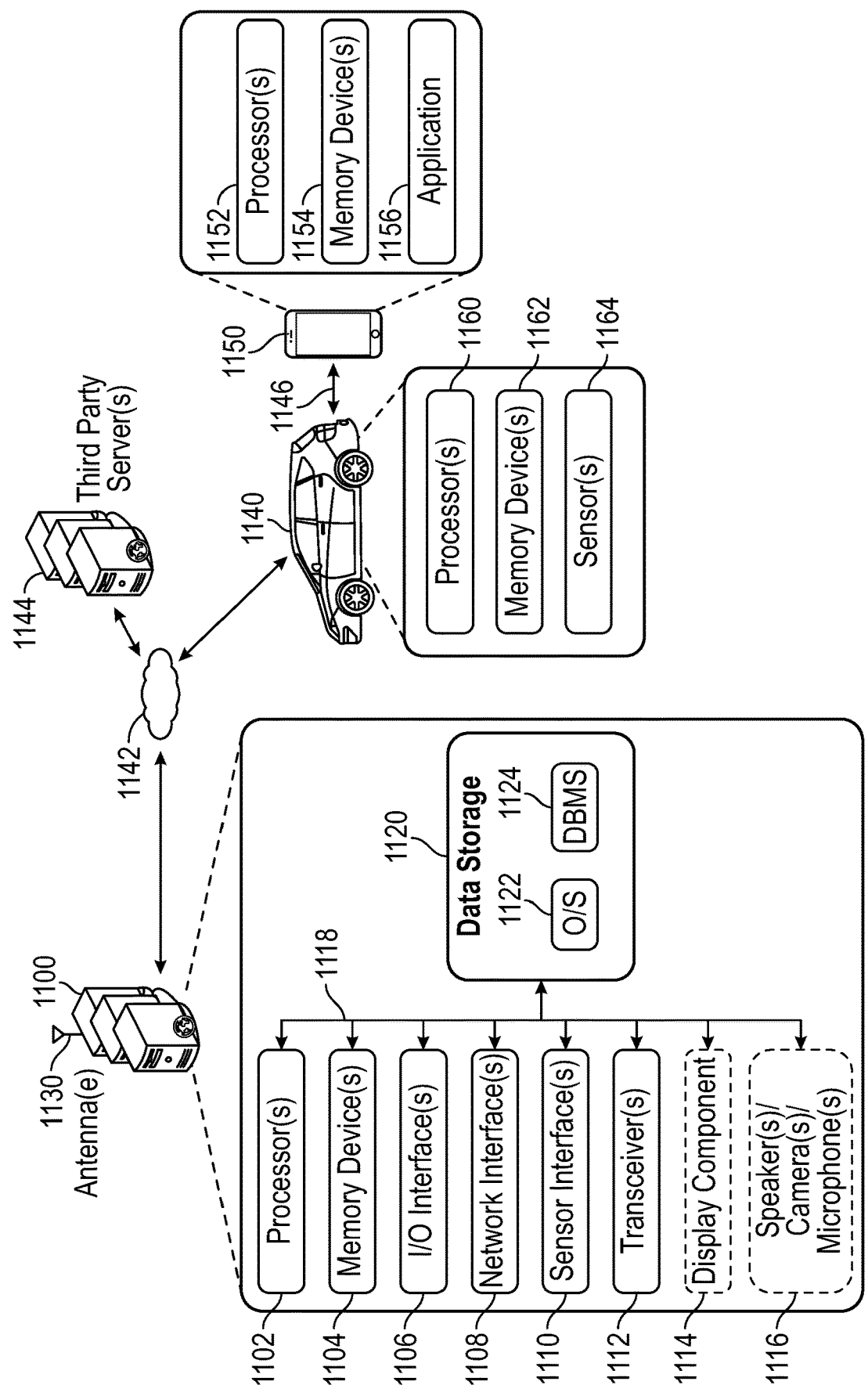
FIG. 11 is a schematic illustration of an example server architecture for one or more servers that may be used for increasing vehicle safety for passengers using blockchain, in accordance with one or more embodiments of the disclosure.

FIG. 11 is a schematic illustration of an example server architecture for one or more server(s) 1100 in accordance with one or more embodiments of the disclosure. In some examples, server 1100 may be similar to server 202 shown and described in connection with FIG. 2, above. The server 1100 illustrated in the example of FIG. 11 may correspond to a server that may be used by a vehicle (for example, vehicle 104 as shown and described in connection with FIG. 1, above), and/or on a network associated with any of the nodes of the network. In an embodiment, the server 1100 may include a cloud-based server that may serve to store and transmit information (for example, images and video of a user, a user residence, and the like). Some or all of the individual components may be optional and/or different in various embodiments. In some embodiments, at least one of the servers described FIG. 11 may be located at or in communication with an AV.

The server 1100 may be in communication with an AV 1140, and one or more user devices 1150. The AV 1140 may be in communication with the one or more user devices 1150. Further, the server 1100, the AV 1140, and/or the user devices 1150 may be configured to communicate via one or more networks 1142. The AV 1140 may additionally be in wireless communication over one or more network(s) 1142 with the user devices 1150 via a connection protocol such as Bluetooth or NFC. Such network(s) 1142 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 1100 may include one or more processors 1102, one or more memory devices 1104 (also referred to herein as memory 1104), one or more input/output (I/O) interface(s) 1106, one or more network interface(s) 1108, one or more sensor(s) or sensor interface(s) 1110, one or more transceiver(s) 1112, one or more optional display components 1114, one or more optional speakers(s)/camera(s)/microphone(s) 1116, and data storage 1120. The server 1100 may further include one or more bus(es) 1118 that functionally couple various components of the server 1100. The server 1100 may further include one or more antenna(e) 1130 that may include, without limitation, a cellular antenna for transmitting or receiving signals to/from a cellular network infrastructure, a GNSS antenna for receiving GNSS signals from a GNSS satellite, a Bluetooth antenna for transmitting or receiving Bluetooth signals, a NFC antenna for transmitting or receiving NFC signals, and so forth. These various components will be described in more detail hereinafter.

The bus(es) 1118 may include at least one of a system bus, a memory bus, an address bus, or a message bus, and may permit the exchange of information (for example, data (including computer-executable code), signaling, etc.) between various components of the server 1100. The bus(es) 1118 may include, without limitation, a memory bus or a memory controller, a peripheral bus, an accelerated graphics port, and so forth. The bus(es) 1118 may be associated with any suitable bus architecture.

The memory 1104 of the server 1100 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 1120 may include removable storage and/or non-removable storage including, but not limited to, magnetic storage, optical disk storage, and/or tape storage. The data storage 1120 may provide non-volatile storage of computer-executable instructions and other data.

The data storage 1120 may store computer-executable code, instructions, or the like that may be loadable into the memory 1104 and executable by the processor(s) 1102 to cause the processor(s) 1102 to perform or initiate various operations. The data storage 1120 may additionally store data that may be copied to the memory 1104 for use by the processor(s) 1102 during the execution of the computer-executable instructions. More specifically, the data storage 1120 may store one or more operating systems (O/S) 1122; one or more database management systems (DBMS) 1124; and one or more program module(s), applications, engines, computer-executable code, scripts, or the like. Some or all of these component(s) may be sub-component(s). Any of the components depicted as being stored in the data storage 1120 may include any combination of software, firmware, and/or hardware. The software and/or firmware may include computer-executable code, instructions, or the like that may be loaded into the memory 1104 for execution by one or more of the processor(s) 1102. Any of the components depicted as being stored in the data storage 1120 may support functionality described in reference to corresponding components named earlier in this disclosure.

The processor(s) 1102 may be configured to access the memory 1104 and execute the computer-executable instructions loaded therein. For example, the processor(s) 1102 may be configured to execute the computer-executable instructions of the various program module(s), applications, engines, or the like of the server 1100 to cause or facilitate various operations to be performed in accordance with one or more embodiments of the disclosure. The processor(s) 1102 may include any suitable processing unit capable of accepting data as input, processing the input data in accordance with stored computer-executable instructions, and generating output data. The processor(s) 1102 may include any type of suitable processing unit.

Referring now to other illustrative components depicted as being stored in the data storage 1120, the 0/S 1122 may be loaded from the data storage 1120 into the memory 1104 and may provide an interface between other application software executing on the server 1100 and the hardware resources of the server 1100.

The DBMS 1124 may be loaded into the memory 1104 and may support functionality for accessing, retrieving, storing, and/or manipulating data stored in the memory 1104 and/or data stored in the data storage 1120. The DBMS 1124 may use any of a variety of database models (for example, relational model, object model, etc.) and may support any of a variety of query languages.

Referring now to other illustrative components of the server 1100, the input/output (I/O) interface(s) 1106 may facilitate the receipt of input information by the server 1100 from one or more I/O devices as well as the output of information from the server 1100 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 1106 may also include a connection to one or more of the antenna(e) 1130 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 1100 may further include one or more network interface(s) 1108 via which the server 1100 may communicate with any of a variety of other systems, platforms, networks, devices, and so forth. The network interface(s) 1108 may enable communication, for example, with one or more wireless routers, one or more host servers, one or more web servers, and the like via one or more networks.

The sensor(s)/sensor interface(s) 1110 may include or may be capable of interfacing with any suitable type of sensing device such as, for example, inertial sensors, force sensors, thermal sensors, photocells, and so forth.

The display component(s) 1114 may include one or more display layers, such as LED or LCD layers, touch screen layers, protective layers, and/or other layers. The optional camera(s) of the speakers(s)/camera(s)/microphone(s) 1116 may be any device configured to capture ambient light or images. The optional microphone(s) of the speakers(s)/camera(s)/microphone(s) 1116 may be any device configured to receive analog sound input or voice data. The microphone(s) of the speakers(s)/camera(s)/microphone(s) 1116 may include microphones used to capture sound.

It should be appreciated that the program module(s), applications, computer-executable instructions, code, or the like depicted in FIG. 11 as being stored in the data storage 1120 are merely illustrative and not exhaustive and that processing described as being supported by any particular module may alternatively be distributed across multiple module(s) or performed by a different module.

It should further be appreciated that the server 1100 may include alternate and/or additional hardware, software, or firmware components beyond those described or depicted without departing from the scope of the disclosure.

The user device 1150 may include one or more computer processor(s) 1152, one or more memory devices 1154, and one or more applications, such as a vehicle application 1156. Other embodiments may include different components.

The processor(s) 1152 may be configured to access the memory 1154 and execute the computer-executable instructions loaded therein. For example, the processor(s) 1152 may be configured to execute the computer-executable instructions of the various program module(s), applications, engines, or the like of the device to cause or facilitate various operations to be performed in accordance with one or more embodiments of the disclosure. The processor(s) 1152 may include any suitable processing unit capable of accepting data as input, processing the input data in accordance with stored computer-executable instructions, and generating output data. The processor(s) 1152 may include any type of suitable processing unit.

The memory 1154 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 1150, the AV application 1156 may be a mobile application executable by the processor 1152 that can be used to present options and/or receive user inputs of information related to the disclosed embodiments. In addition, the user device 1150 may communicate with the AV 1140 via the network 1142 and/or a direct connect, which may be a wireless or wired connection. The user device 1150 may include a camera, scanner, bio reader or the like to capture biometric data of a user, perform certain processing step on the biometric date, such as extracting features from captured biometric data, and then communicating those extracted features to one or more remote servers, such as one or more of cloud-based servers.

The autonomous vehicle 1140 may include one or more computer processor(s) 1160, one or more memory devices 1162, one or more sensors 1164, and one or more applications, such as an autonomous driving application 1166. Other embodiments may include different components. A combination or sub combination of these components may be integral to the controller 606 in FIG. 6. The autonomous vehicle 1140 may additionally be in wireless communication 1146 with the user device 1150 via a connection protocol such as Bluetooth or Near Field Communication.

The processor(s) 1160 may be configured to access the memory 1162 and execute the computer-executable instructions loaded therein. For example, the processor(s) 1160 may be configured to execute the computer-executable instructions of the various program module(s), applications, engines, or the like of the device to cause or facilitate various operations to be performed in accordance with one or more embodiments of the disclosure. The processor(s) 1160 may include any suitable processing unit capable of accepting data as input, processing the input data in accordance with stored computer-executable instructions, and generating output data. The processor(s) 1160 may include any type of suitable processing unit.

The memory 1162 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

It should be appreciated that the program module(s), applications, computer-executable instructions, code, or the like depicted in FIG. 11 as being stored in the data storage 1120 are merely illustrative and not exhaustive and that processing described as being supported by any particular module may alternatively be distributed across multiple module(s) or performed by a different module.

It should further be appreciated that the server 1100 may include alternate and/or additional hardware, software, or firmware components beyond those described or depicted without departing from the scope of the disclosure.

EXAMPLE EMBODIMENTS

Example embodiments of the disclosure may include one or more of the following examples:

Example 1 may include a method, comprising: tracking a location of a first user using at least one device; determining a first state comprising the first user entering a vehicle with a second user; receiving a first confirmation of the first state from the device; adding a first transaction to a blockchain, the first transaction comprising a description of the first state and the first confirmation; determining a second state comprising the second user exiting the vehicle while the first user remains in the vehicle; and adding a second transaction to the blockchain, the second transaction comprising a description of the second state.

Example 2 may include the method of example 1 and/or some other example herein, wherein the device is a first device, and the method further comprises: transmitting a message to a second device, the second message indicating of the second state; receiving a second confirmation of the from the device; and adding a third transaction to the blockchain, the third transaction comprising the second state and the second confirmation.

Example 3 may include the method of example 1 and/or some other example herein, wherein the method further comprises performing at least one action, the action comprising transmitting a message to a second device, the message indicative of the second state.

Example 4 may include the method of example 3 and/or some other example herein, wherein the action comprises at least one of turning on a climate control system of the vehicle, opening a window of the vehicle, activating a security system of the vehicle, or transmitting a vehicle-to-everything (V2X) message to the second device, the V2X message indicative of the second state.

Example 5 may include the method of example 1 and/or some other example herein, wherein tracking the location of the first user comprises: determining a first location of the first user by the device; and determining a second location of the first user by a second device.

Example 6 may include the method of example 5 and/or some other example herein, wherein the description of the first state or the description of the second state comprises the first location or the second location.

Example 7 may include the method of example 1 and/or some other example herein, wherein the location comprises a residence of the first user or the second user, a daycare for the first user, or a store.

Example 8 may include the method of example 1 and/or some other example herein, wherein the device comprises a mobile phone, a security system, or a camera system.

Example 9 may include a device, comprising: at least one memory device that stores computer-executable instructions; and at least one processor configured to access the at least one memory device, wherein the at least one processor is configured to execute the computer-executable instructions to: track a location of a first user using at least one device; determine a first state comprising the first user entering a vehicle with a second user; receive a first confirmation of the first state from the device; add a first transaction to a blockchain, the first transaction comprising a description of the first state and the first confirmation; determine a second state comprising the second user exiting the vehicle while the first user remains in the vehicle; and add a second transaction to the blockchain, the second transaction comprising a description of the second state.

Example 10 may include the device of example 9 and/or some other example herein, wherein the device is a first device, and the at least one processor is configured to execute the computer-executable instructions to: transmit a message to a second device, the message indicating of the second state; receive a second confirmation of the from the device; and add a third transaction to the blockchain, the third transaction comprising the second state and the second confirmation.

Example 11 may include the device of example 9 and/or some other example herein, wherein the at least one processor is configured to execute the computer-executable instructions to perform at least one action, the action comprising transmitting a message to a second device, the message indicative of the second state.

Example 12 may include the device of example 11 and/or some other example herein, wherein the action comprises at least one of turning on a climate control system of the vehicle, opening a window of the vehicle, activating a security system of the vehicle, or transmitting a vehicle-to-everything (V2X) message to the second device, the V2X message indicative of the second state.

Example 13 may include the device of example 9 and/or some other example herein, wherein tracking the location of the first user comprises: determining a first location of the first user by the device; and determining a second location of the first user by a second device.

Example 14 may include the device of example 13 and/or some other example herein, wherein the description of the first state or the description of the second state comprises the first location or the second location.

Example 15 may include a non-transitory computer-readable medium storing computer-executable instructions which, when executed by a processor, cause the processor to perform operations comprising: tracking a location of a first user using at least one device; determining a first state comprising the first user entering a vehicle with a second user; receiving a first confirmation of the first state from the device; adding a first transaction to a blockchain, the first transaction comprising a description of the first state and the first confirmation; determining a second state comprising the second user exiting the vehicle while the first user remains in the vehicle; and adding a second transaction to the blockchain, the second transaction comprising a description of the second state.

Example 16 may include the non-transitory computer-readable medium of example 15 and/or some other example herein, wherein the device is a first device, and the method further comprises: transmitting a message to a second device, the message indicating of the second state; receiving a second confirmation of the from the device; and adding a third transaction to the blockchain, the third transaction comprising the second state and the second confirmation.

Example 17 may include the non-transitory computer-readable medium of example 15 and/or some other example herein, wherein the method further comprises performing at least one action, the action comprising transmitting a message to a second device, the message indicative of the second state.

Example 18 may include the non-transitory computer-readable medium of example 17 and/or some other example herein, wherein the action comprises at least one of turning on a climate control system of the vehicle, opening a window of the vehicle, activating a security system of the vehicle, or transmitting a vehicle-to-everything (V2X) message to the second device, the V2X message indicative of the second state.

Example 19 may include the non-transitory computer-readable medium of example 15 and/or some other example herein, wherein tracking the location of the first user comprises: determining a first location of the first user by the device; and determining a second location of the first user by a second device.

Example 20 may include the non-transitory computer-readable medium of example 19 and/or some other example herein, wherein the description of the first state or the description of the second state comprises the first location or the second location.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   tracking a location of a first user using a first device at a first location;
   receiving, from the first device, an indication of a first state comprising the first user entering a vehicle with a second user;
   transmitting a first message to a second device in the first location, the first message indicative of the first state, wherein the first message causes the second device to adjust a field of view of the second device towards the vehicle;
   receiving a first confirmation of the first state from the second device;
   adding a first transaction to a blockchain, the first transaction comprising a description of the first state and the confirmation of the first state;
   receiving an indication of a second state comprising, at a second location, the second user exiting the vehicle while the first user remains in the vehicle; and
   adding a second transaction to the blockchain, the second transaction comprising a description of the second state.

2. The method of claim 1, wherein the device is a first device, and the method further comprises:
   transmitting a second message to a third device at the second location, the second message indicative of the second state;
   receiving a second confirmation of the second state from the third device; and
   adding a third transaction to the blockchain, the third transaction comprising the second state and the second confirmation.

3. The method of claim 2, wherein the first device comprises a mobile phone, a security system, or a camera system.

4. The method of claim 1, wherein the method further comprises performing at least one action based on the confirmation of the second state.

5. The method of claim 4, wherein the action comprises at least one of turning on a climate control system of the vehicle, opening a window of the vehicle, activating a security system of the vehicle, or transmitting a vehicle-to-everything (V2X) message to the second device, the V2X message indicative of the second state.

6. The method of claim 1, wherein the description of the first state or the description of the second state comprises the first location or the second location.

7. The method of claim 1, wherein the first location and the second location comprise at least one of: a residence of the first user or the second user, a daycare for the first user, or a store.

8. The method of claim 1, further comprising:
   determining that a minimum number of nodes exist on a blockchain network comprising the blockchain.

9. A system, comprising:
   at least one memory device that stores computer-executable instructions; and
   at least one processor configured to access the at least one memory device, wherein the at least one processor is configured to execute the computer-executable instructions to:
      determine, based on an image captured by a first camera at a first location, a first state comprising a first user entering a vehicle with a second user at the first location, the camera being external and separate from the vehicle;
      transmit a first message to a second device in the first location, the first message indicative of the first state, wherein the first message causes the second device to adjust a field of view of the second device towards the vehicle;
      receive a first confirmation of the first state from the second device;
      add a first transaction to a blockchain, the first transaction comprising a description of the first state and the first confirmation;
      determine a second state comprising the second user exiting the vehicle at a second location while the first user remains in the vehicle; and
      add a second transaction to the blockchain, the second transaction comprising a description of the second state.

10. The system of claim 9, wherein the at least one processor is configured to execute the computer-executable instructions to:
    transmit a second message to a third device at the second location, the second message indicative of the second state;
    receive a second confirmation of the second state from the third device; and
    add a third transaction to the blockchain, the third transaction comprising the second state and the second confirmation.

11. The system of claim 9, wherein the at least one processor is configured to execute the computer-executable instructions to perform at least one action based on the confirmation of the second state.

12. The system of claim 11, wherein the action comprises at least one of turning on a climate control system of the vehicle, opening a window of the vehicle, activating a security system of the vehicle, or transmitting a vehicle-to-everything (V2X) message to the second device, the V2X message indicative of the second state.

13. The system of claim 9, wherein the description of the first state or the description of the second state comprises the first location or the second location.

14. A non-transitory computer-readable medium storing computer-executable instructions which, when executed by a processor, cause the processor to perform operations comprising:
    tracking a location of a first user using a first device at a first location;
    determining a first state comprising the first user entering a vehicle with a second user;
    transmitting a first message to a second device in the first location, the first message indicative of the first state, wherein the first message causes the second device to adjust a field of view of the second device towards the vehicle;
    receiving a first confirmation of the first state from the second device;

adding a first transaction to a blockchain, the first transaction comprising a description of the first state and the first confirmation;

determining, based on an image captured by a camera of a third device at a second location, a second state comprising the second user exiting the vehicle at the first location while the first user remains in the vehicle, the camera of the third device being external and separate from the vehicle; and adding a second transaction to the blockchain, the second transaction comprising a description of the second state.

15. The non-transitory computer-readable medium of claim 14, wherein the computer-executable instructions cause the processor to perform operations further comprising:

transmitting a second message to a fourth device, the second message indicative of the second state;

receiving a second confirmation of the second state from the third device; and adding a third transaction to the blockchain, the third transaction comprising the second state and the second confirmation.

16. The non-transitory computer-readable medium of claim 14, wherein the computer-executable instructions cause the processor to perform operations further comprising performing at least one action based on the confirmation of the second state.

17. The non-transitory computer-readable medium of claim 16, wherein the action comprises at least one of turning on a climate control system of the vehicle, opening a window of the vehicle, activating a security system of the vehicle, or transmitting a vehicle-to-everything (V2X) message to the second device, the V2X message indicative of the second state.

18. The non-transitory computer-readable medium of claim 14, wherein the description of the first state or the description of the second state comprises the first location or the second location.

* * * * *